No. 780,446. Patented January 17, 1905.

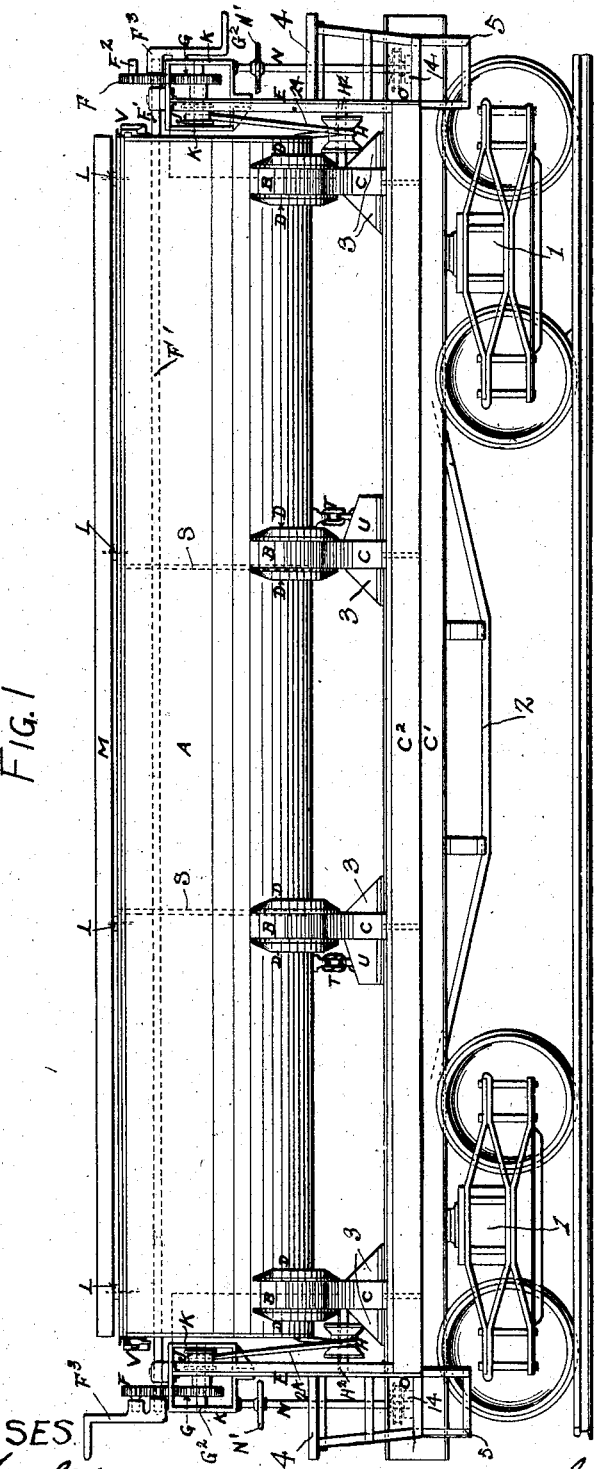

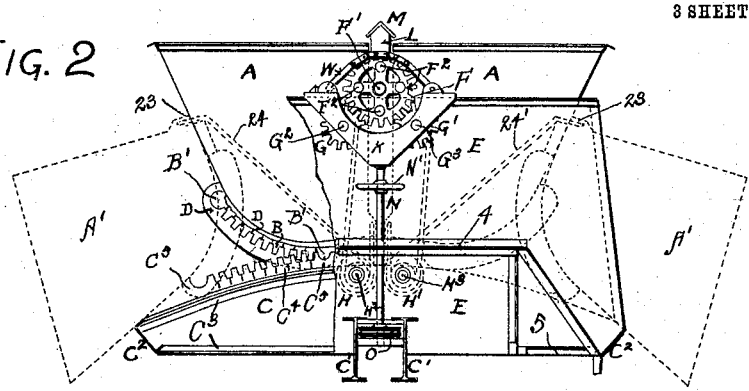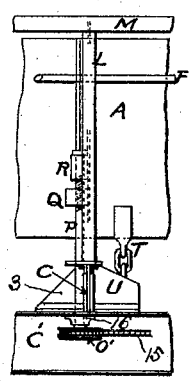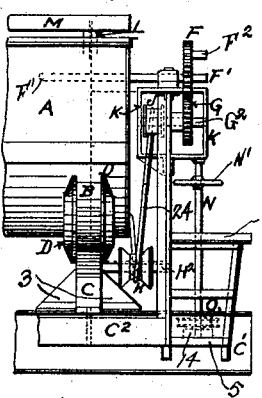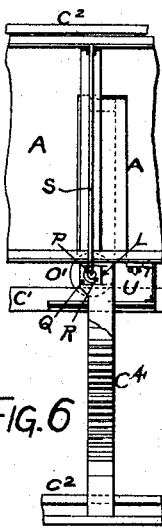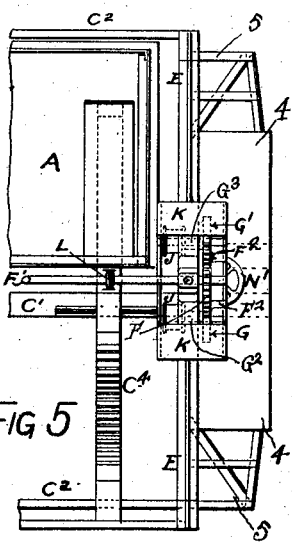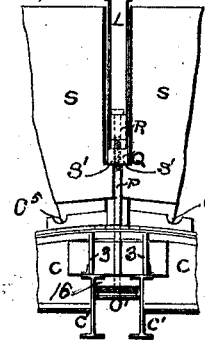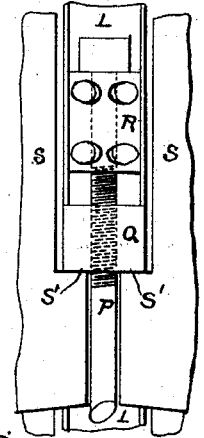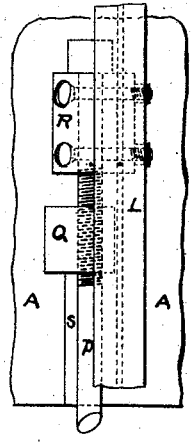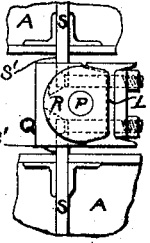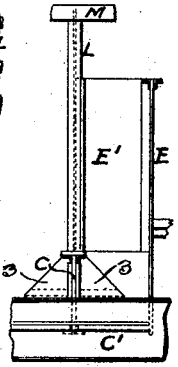

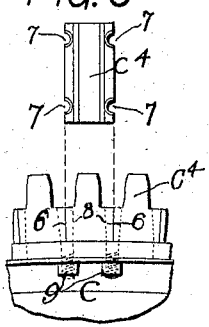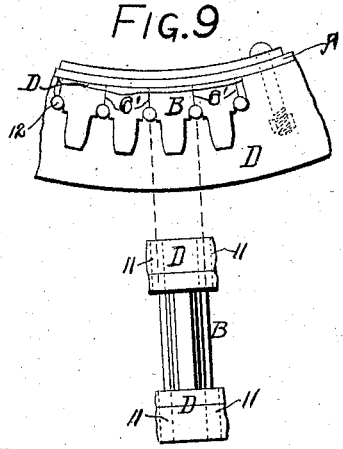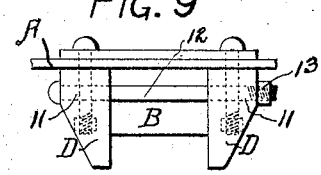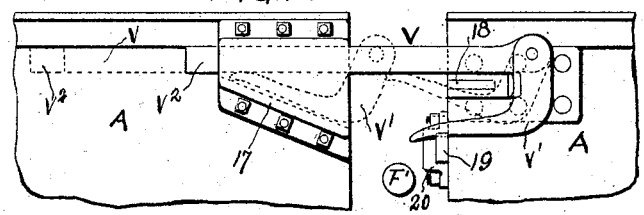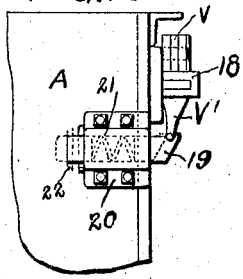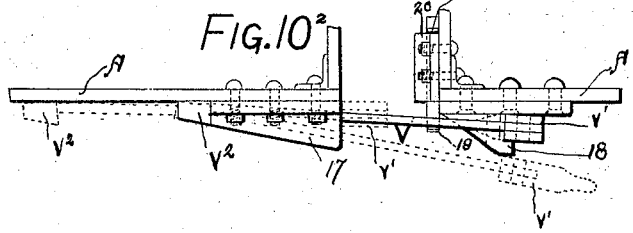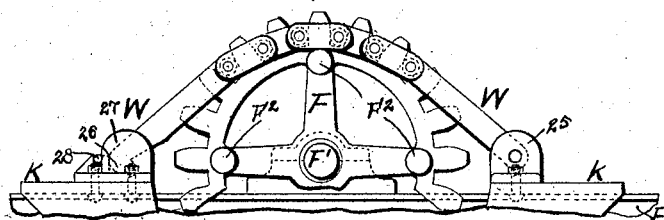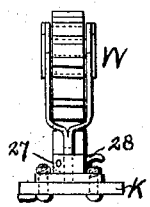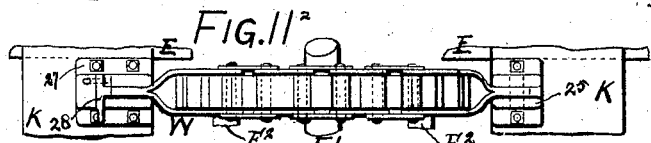

UNITED STATES PATENT OFFICE.

JAMES H. RICHARDSON, OF ROCKYFORD, COLORADO.

DUMPING-VEHICLE.

SPECIFICATION forming part of Letters Patent No. 780,446, dated January 17, 1905.

Application filed June 2, 1904. Serial No. 210,875.

*To all whom it may concern:*

Be it known that I, JAMES H. RICHARDSON, a citizen of the United States, residing at Rockyford, in the county of Otero and State of Colorado, have invented certain new and useful Improvements in Dumping-Vehicles; and I do hereby declare the following to be a full, clear, and exact description of the invention, such as will enable others skilled in the art to which it appertains to make and use the same.

This invention relates to dumping-vehicles, more particularly to gravity dumping-vehicles; and the objects of the invention are to improve the construction of such devices and provide a simple and highly-efficient means for dumping and reseating the body of the car.

Further objects of the invention are to provide an improved means for operating a dumping-vehicle having a longitudinally-divided body and outwardly-tilting sections, thereby being particularly applicable for use in the construction of the road-bed of any road or railway, as well as to wagons for coal, ore, and other similar loose material which requires to be carried or handled in the way of transit or delivery under any conditions.

To the accomplishment of these objects and such others as may hereinafter appear the invention consists of a dumping-vehicle embodying the novel features of construction, combinations of elements, and arrangement of parts having the general mode of operation substantially as hereinafter described, and particularly pointed out in the appended claims, reference being had to the accompanying drawings, forming a part hereof, in which the same reference characters designate like parts throughout the several views, and in which—

Figure 1 shows a side elevational view of the assembled parts as applied to a railway-car. Fig. 2 shows an end elevational view of the body of the vehicle, partially broken away. Fig. 3 shows an elevational view of the operating mechanism on one end of the vehicle. Fig. 4 shows a longitudinal sectional view of a portion of the vehicle-body provided with the side locking mechanism. Figs. $4'$, $4^2$, $4^3$, and $4^4$ show details of the locking mechanism shown in Figs. 4 and 6. Fig. 5 shows a plan view of one end of the vehicle-body with one dumping-section removed. Fig. 6 shows a plan view of a portion of the vehicle-body provided with the releasing-lock shown in Fig. 4 with one of the dumping-sections removed. Fig. 7 shows the construction of one end of the vehicle-frame. Fig. 8 shows an elevational view of a portion of the toothed girders and a plan view of one of the removable teeth. Fig. 9 shows a longitudinal sectional view of the teeth and guides secured to the bottom of the vehicle-body and a plan view of one of the removable teeth. Fig. $9'$ shows a transverse sectional view through the teeth on the vehicle-body. Fig. 10 shows a detail elevational view of the locking mechanism on the end of the vehicle-body. Fig. $10'$ shows a longitudinal sectional view of Fig. 10. Fig. $10^2$ shows a plan view of Fig. 10. Fig. 11 shows a detail elevational view of the reseating locking mechanism on one end of the vehicle-body, and Figs. $11'$ and $11^2$ show end elevation and plan views of Fig. 11.

For convenience of illustration the invention will be described as applied to a railway-car; and the same consists, primarily, of two longitudinally-arranged parts or receptacles mounted thereon, means for holding said receptacles in locked position, means for dumping and reseating the same, and means for retaining them on the car when in dumping position.

Referring to the drawings, 1 represents car-trucks, of any suitable construction, upon which rests the frame of the device, comprising, preferably, a pair of parallelly-arranged I-beams $C'$, suitably trussed, as at 2, running longitudinally of the structure, at substantially the center thereof, and on which are securely fastened at intervals, as by angle-plates 3, a number of transverse girders C, suitably stiffened by angle-irons or other convenient means $C^3$ and having their outer ends bound together, preferably by longitudinally-arranged channel-beams $C^2$, which also act as bumpers for the sections of the car when in dumping position. Secured to the transverse girders C and rising vertically therefrom between the movable parts of the car-body are standards L, preferably of I-beam section, across of the top of which and running longitudinally of the car-body is secured an angle-bar M, heel up, so that the legs thereof overlap the inner edges of the sections of the car-body, acting as a deflector to prevent material from falling therebetween. It is of course understood that any arrangement of overlapping shelf would be suitable for this purpose; but an angle-iron section is peculiarly adaptable in this connection and is therefore preferably used.

At each end of the car, a convenient distance away from the dumping-receptacle, are arranged plates E, suitably stiffened and braced to the nearest standard L by a plate E'. These plates E form a supporting means for the operating and locking mechanisms to be hereinafter described. Outside of the plates E and over the I-beams C' are built suitable platforms 4, having depending steps 5, as is usual in car construction.

The transverse girders C are formed with a curved surface, (see Fig. 2,) on which, on each side of the center line, are secured a set of gear-teeth $C^4$ in such manner that any one thereof may be removed and replaced independently of the others. To accomplish this end, the teeth are formed separately, being divided in the center of their roots, as at 6, Fig. 8, and tapered bearings 7 are drilled or otherwise formed in said root with such dividing-line as a center. Through these bearings and through concentric holes drilled in the stiffening-flange $C^3$ on the girders C are passed taper-headed bolts 8, drawn home by nuts 9. On each end of the set of teeth $C^4$ is a terminating member $C^5$, Fig. 2, having formed therein a substantially semicircular groove or recess, used for a purpose to be hereinafter described.

The car-body or carrying part is formed in two longitudinally arranged parts or sections A, having substantially vertical inner sides and outwardly-flaring outer sides, forming hopper-like receptacles with partially rounded bottoms. At points on these rounded bottoms coincident with the girders C and gear-teeth $C^4$, formed thereon, are secured sets of gear-teeth B, constructed to intermesh with teeth $C^4$. On each side of the teeth B are bolted or otherwise suitably secured to the car-body strips D, which act as guides to keep teeth B in alinement with teeth $C^4$. Teeth B are made independently removable for the purpose of replacement when worn out or for other reasons, and to this end are divided centrally of their roots, as at 6', and a groove 10 is also formed centrally over said dividing-line, and in said groove, through holes 11, concentric therewith in the guides D, is passed a bolt or other suitable securing means 12, fastened with a nut 13, the bolt being of such size as to be readily accommodated by the groove without impeding the proper working of the teeth. On each end of the set of teeth B is a terminating member B', Fig. 2, formed with a substantially semicircular lug or projection thereon and adapted to engage with the recesses $C^5$. When the parts A are dumped, they fall to a position wherein the lower sides are at an angle of about forty degrees, as shown by the position A', Fig. 2.

The means for locking the part A of the car-body in upright position consist of two independent sets of locks, one set on the ends of the car-body and a second set between the sections A, constructed to lock the sides together. The latter will be described first.

It is seen by reference to Figs. 4' to $4^4$ and Fig. 6 that the sections A are divided at intervals substantially opposite the girders C and standards L by partitions S into separate compartments. These partitions are so shaped as to leave a projecting lug or shoulder S' toward the lower portion thereof, Figs. 4' and $4^2$, which projects into the space between the sections A. On the plate E is fastened a bracket K, and journaled between said bracket and a brace 14 between the beams C' is a shaft N, carrying an operating-handle N', here shown as a wheel, and a sprocket-wheel O, which is connected to another sprocket-wheel O' by a chain 15, Fig. 4. Sprocket O' is secured to a vertically-arranged shaft P, the ends of which are journaled in a plate 16 between the beams C' and a lug R, bolted or otherwise suitably secured to the standard L. Threaded on the shaft P is a block Q, adapted to bear against the shoulders S' of the partitions S, and thus act as a side lock to hold the sections A in upright position, Fig. $4^2$ to $4^4$. It is readily seen that block Q is easily released from engagement with the shoulders S' by turning hand-wheel N' in the proper direction. Any suitable arrangement, as the usual ratchet and pawl, locks the shaft N from rotating. (Not shown.)

The locking means located on the ends of the sections (shown in Figs. 10, 10', and $10^2$) consist of a suitable bolt or bar V, having a bell-crank locking-lever V' pivotally connected to one end and a lug $V^2$ formed on the other. This bar is adapted to slide through a housing 17 and in its extended position rests upon a lug 18, suitably secured to the car-body A. In moving the bar outwardly from the housing into locking position the locking-lever is swung over the top of the lug 18 and then brought into position to be held by a sliding check 19, mounted within a housing 20 and provided with a spiral spring 21, adapted to force the check outwardly. The sections are thus held securely together by the lug $V^2$ bearing on the projecting end of the housing 17 and the lever V' bearing against the lug 18. To the rear end of the check 19 is attached a ring or other projection 22 to prevent the check from being forced entirely out. To release this lock, the lever V' is forced from engagement with the check 19 and swung free of the lug 18. The bar V is then forced outwardly, as shown by dotted lines, Fig. 10², and from there shoved home within the housing 17, where it is out of harm's way in reseating the sections A.

The mechanism for bringing the sections A back into loading position after having been dumped by tilting the same outwardly will now be described, together with the means for locking such mechanism in any desired angular position of the sections.

It will be noted that upon releasing the two locking mechanisms already described (first the end locks V, &c., then the side locks Q, &c.,) the sections A A will automatically fall by gravity, the two sets of gear-teeth described intermeshing and the guides D carrying the sections on their proper path. The sections fall until stopped by the bumpers C² and by the check-chains T, secured to the sections A and I-beams C', which normally rest in boxes U, preferably formed by bracing across two of the stiffeners 3. (See Fig. 6.)

In the upper part of the bracket K on each end of the car is mounted a gear-wheel F on the ends of a shaft F', extending longitudinally of the car between the sections A, having bearings in the standards L and journaled on the tops of end plates E or otherwise suitably located. Gear-wheels F are provided with lugs F², on which and the end of shaft F' fits a crank F³, by means of which power is applied. Meshing with gear F are two other gears, G and G', mounted on shafts G² and G³, preferably journaled in the bracket K. Mounted on shafts G² and G³, preferably in the rear of gears G and G', are spools J and J'. Below these spools are shafts H² and H³, conveniently located, as by journaling the ends thereof in plate E and girder C, and mounted thereon are drums H and H'. To the inner lower corners 23 of sections A or any other convenient place are secured one end of cables or chains 24 and 24', which pass down and over drums H and H', respectively, then up, and the other ends are secured to spools J and J', respectively, (see Fig. 2,) in such manner that when gear F is rotated clockwise said cables or chains will be wound on said spools. Gears G and G' are connected to spools J and J' by any well-known clutch mechanism, (not shown,) whereby one of the said gears may be slipped forward on its shaft out of engagement with gear F, and either section of the car-body may thus be brought into position or dumped independently of the other. The means for locking this reseating-gear is shown in Figs. 11, 11', and 11² and consists of a sprocket-chain W, adapted to engage with gear F, having one end pivoted in a suitable lug or projection 25, mounted on bracket K, and its other end provided with a recess forming a tooth 26, which engages under a similarly-formed projection formed in a lug or projection 27, also mounted on bracket K. A latch 28 is also pivotally mounted in lug 27 and serves to wedge and lock the sprocket-chain W in position.

The operation of the device is obvious. In order to dump the sections, locks V, Q, and W are released in the order named and the sections A will fall by gravity. By applying power to crank F³ the sections are brought back into position and reseated when they are locked.

While the invention has been described with particular reference to the details of construction, it should be understood that it is not to be limited thereto, as many and various changes, alterations, and substitutions may be made therein and still fall within its scope and principle; but What I do claim, and desire to secure by Letters Patent, is—

1. In a longitudinally-divided gravity dumping-vehicle, the combination with the half-sections, of end locks and side locks constructed to retain said sections in upright position, and means for operating said locks, substantially as described.

2. In a longitudinally-divided gravity dumping-vehicle, the combination with the half-sections, of end locks and side locks constructed to retain said sections in upright position, and independent means for operating said locks, substantially as described.

3. In a longitudinally-divided gravity dumping-vehicle, the combination with the half-sections having rounded bottoms, of transverse girders on the vehicle-frame on which said rounded bottoms roll when said sections are tilted outwardly, means for reseating said sections after being dumped, and means for locking said reseating means after said sections are reseated, substantially as described.

4. In a longitudinally-divided gravity dumping-vehicle, the combination with the half-sections having rounded bottoms, of transverse girders on the vehicle-frame on which said rounded bottoms roll when said sections are tilted outwardly, means for reseating said sections after being dumped, and independently-operated end and side locks constructed to retain said sections in upright position, substantially as described.

5. In a longitudinally-divided gravity dumping-vehicle, the combination with the half-sections having rounded bottoms, of transverse girders on the vehicle-frame, sets of gear-teeth on said bottoms and said girders adapted to intermesh when said sections are tilted outwardly, means for removing any tooth independently of the others, and means for reseating said sections after being dumped, substantially as described.

6. In a longitudinally-divided gravity dumping-vehicle, the combination with the half-sections having rounded bottoms, of transverse girders on the vehicle-frame, a set of gear-teeth on said girders, a set of gear-teeth on said rounded bottoms provided with guides constructed to keep said two sets of teeth in engagement when said sections are tilted outwardly, and means for reseating said sections after being dumped, substantially as described.

7. In a longitudinally-divided gravity dumping-vehicle, the combination with the half-sections, of an end lock constructed to retain said sections in upright position comprising a sliding bar provided on one end with a lug adapted to engage with a projection on one section and on the other end with a locking-lever adapted to engage with a lug on the other section, substantially as described.

8. In a longitudinally-divided gravity dumping-vehicle, the combination with the half-sections, of an end lock constructed to retain said sections in upright position comprising a sliding bar provided on one end with a lug adapted to engage with a projection on one section and on the other end with a locking-lever adapted to engage with a lug on the other section, and a sliding check constructed to engage with said lever and hold it in position, substantially as described.

9. In a longitudinally-divided gravity dumping-vehicle, the combination with the half-sections, of an end lock constructed to retain said sections in upright position comprising a sliding bar provided on one end with a lug adapted to engage with a projection on one section and on the other end with a bell-crank locking-lever adapted to engage with a lug on the other section, and a spring-pressed sliding check constructed to engage with said lever and hold it in position, substantially as described.

10. In a longitudinally-divided gravity dumping-vehicle, the combination with the half-sections, of an end lock constructed to retain said sections in upright position comprising a sliding bar provided with a lug on one end and a locking-lever on the other, a lug on one section with which said lever is adapted to engage, and a housing on the other section with which the lug on said bar is adapted to engage and into which said lock is adapted to slide when the sections are in dumping position, substantially as described.

11. In a longitudinally-divided gravity dumping-vehicle, the combination with the half-sections, of an end lock constructed to retain said sections in upright position comprising a sliding bar provided with a lug on one end and a locking-lever on the other, a lug on one section with which said lever is adapted to engage, and a housing on the other section with which the lug on said bar is adapted to engage and into which said lock is adapted to slide when the sections are in dumping position, and a sliding check constructed to engage with said lever and hold it in position, substantially as described.

12. In a longitudinally-divided gravity dumping-vehicle, the combination with the half-sections, of a side lock constructed to retain said sections in upright position comprising a block mounted between said sections, projecting shoulders on the sides of said sections and means for moving said block into locking engagement with said shoulders, substantially as described.

13. In a longitudinally-divided gravity dumping-vehicle, the combination with the half-sections, of a side lock constructed to retain said sections in upright position comprising a block mounted between said sections, projecting shoulders on the sides of said sections and hand-operated means for moving said block into locking engagement with said shoulders, substantially as described.

14. In a longitudinally-divided gravity dumping-vehicle, the combination with the half-sections, of a side lock constructed to retain said sections in upright position comprising a block threaded on a shaft mounted between said sections, projecting shoulders on the sides of said sections and means for rotating said shaft and thereby moving said block into locking engagement with said shoulders, substantially as described.

15. In a longitudinally-divided gravity dumping-vehicle, the combination with the half-sections having transverse partitions provided with projecting shoulders, of a side lock constructed to retain said sections in upright position comprising a block mounted between said sections and means for moving said block into locking engagement with said shoulders, substantially as described.

16. In a longitudinally-divided gravity dumping-vehicle, the combination with the half-sections having transverse partitions provided with projecting shoulders, of a side lock constructed to retain said sections in upright position comprising a block threaded on a shaft mounted between said sections, and a sprocket and chain for rotating said shaft and moving said block into locking engagement with said shoulders, substantially as described.

17. In a longitudinally-divided gravity dumping-vehicle, the combination with the outwardly-tilting half-sections, of means for reseating said sections comprising a power-wheel, winding-drums operatively connected with said power-wheel, and flexible haulage means connecting said sections and said drums, substantially as described.

18. In a longitudinally-divided gravity dumping-vehicle, the combination with the outwardly-tilting half-sections, of means for reseating said sections comprising a hand-operated power-wheel, winding-drums operatively connected with said power-wheel, and flexible haulage means connecting said sections and said drums, substantially as described.

19. In a longitudinally-divided gravity dumping-vehicle, the combination with the outwardly-tilting half-sections, of means for reseating said sections comprising a power-wheel, winding-drums operatively connected with said power-wheel, flexible haulage means connecting said sections and said drums, and guiding-spools over which said haulage means run, substantially as described.

20. In a longitudinally-divided gravity dumping-vehicle, the combination with the outwardly-tilting half-sections, of means for reseating said sections comprising a power-wheel, winding-drums operatively connected with said power-wheel, flexible haulage means connecting said sections and said drums, and means for locking said power-wheel against rotation, substantially as described.

21. In a longitudinally-divided gravity dumping-vehicle, the combination with the outwardly-tilting half-sections, of means for reseating said sections comprising a power-wheel, winding-drums operatively connected with said power-wheel, flexible haulage means connecting said sections and said drums, and means for locking said sections when reseated, substantially as described.

22. In a longitudinally-divided gravity dumping-vehicle, the combination with the outwardly-tilting half-sections, of means for reseating said sections comprising a power-wheel, winding-drums operatively connected with said power-wheel, flexible haulage means connecting said sections and said drums, means for locking said power-wheel against rotation, and means for locking said sections when reseated, substantially as described.

23. In a longitudinally-divided gravity dumping-vehicle, the combination with the outwardly-tilting half-sections, of means for reseating said sections comprising a power-wheel, winding-drums operatively connected with said power-wheel, flexible haulage means connecting said sections and said drums, means for locking said power-wheel against rotation, and independently-operated end and side locks for securing said sections when reseated, substantially as described.

24. In a longitudinally-divided gravity dumping-vehicle, the combination with the outwardly-tilting half-sections, of means for reseating said sections comprising a power gear-wheel, winding-drums provided with gears adapted to intermesh with said power-gear, flexible haulage means connecting said sections and said drums and guiding-spools over which said haulage means run, substantially as described.

25. In a longitudinally-divided gravity dumping-vehicle, the combination with the outwardly-tilting half-sections, of means for reseating said sections comprising a power gear-wheel, winding-drums operatively connected with said power-gear, flexible haulage means connecting said sections and said drums, and means for locking said power-gear against rotation comprising a sprocket-chain binding on its teeth, and a latch for retaining said chain in position, substantially as described.

26. In a longitudinally-divided gravity dumping-vehicle, the combination with the half-sections having rounded bottoms, of transverse girders on the vehicle-frame on which said rounded bottoms roll when said sections are tilted outwardly, and means for reseating said sections comprising a power-wheel, winding-drums operatively connected with said power-wheel, and flexible haulage means connecting said sections and said drums, substantially as described.

27. In a longitudinally-divided gravity dumping-vehicle, the combination with the half-sections having rounded bottoms, of transverse girders on the vehicle-frame, sets of gear-teeth on said bottoms and said girders adapted to intermesh when said sections are tilted outwardly, and means for reseating said sections comprising a power-wheel, winding-drums operatively connected with said power-wheel, and flexible haulage means connecting said sections and said drums, substantially as described.

28. In a longitudinally-divided gravity dumping-vehicle, the combination with the outwardly-tilting half-sections, of a single mechanism for reseating each of said sections independently of the other as may be desired, substantially as described.

29. In a longitudinally-divided gravity dumping-vehicle, the combination with the outwardly-tilting half-sections, of means for reseating either of said sections independently of the other comprising a power-wheel, reseating mechanism for each section connected to be operated by said power-wheel and means for disconnecting either of said mechanisms from said power-wheel as may be desired, substantially as described.

30. In a longitudinally-divided gravity dumping-vehicle, the combination with the half-sections of standards mounted on the vehicle-frame between said sections and a material-deflecting plate mounted on said standards, substantially as described.

In testimony whereof I affix my signature in presence of two witnesses.

JAMES H. RICHARDSON.

Witnesses:
 GEO. H. TAYLOR,
 ELLA S. RICHARDSON.